Patented Feb. 1, 1944

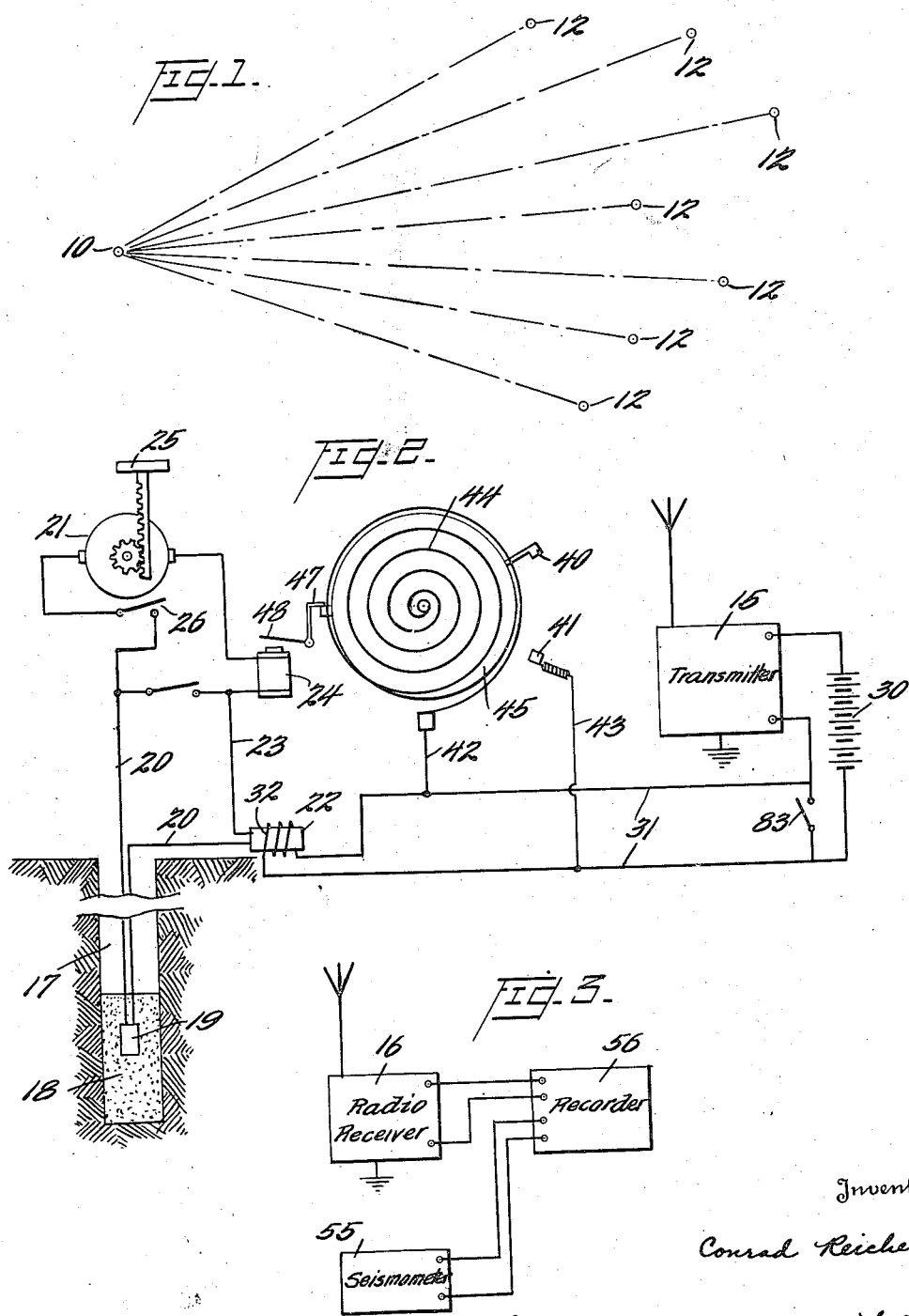
Feb. 1, 1944. C. REICHERT 2,340,770
SEISMIC RECORDING SYSTEM
Filed June 13, 1940 — 3 Sheets-Sheet 1
Inventor
Conrad Reichert

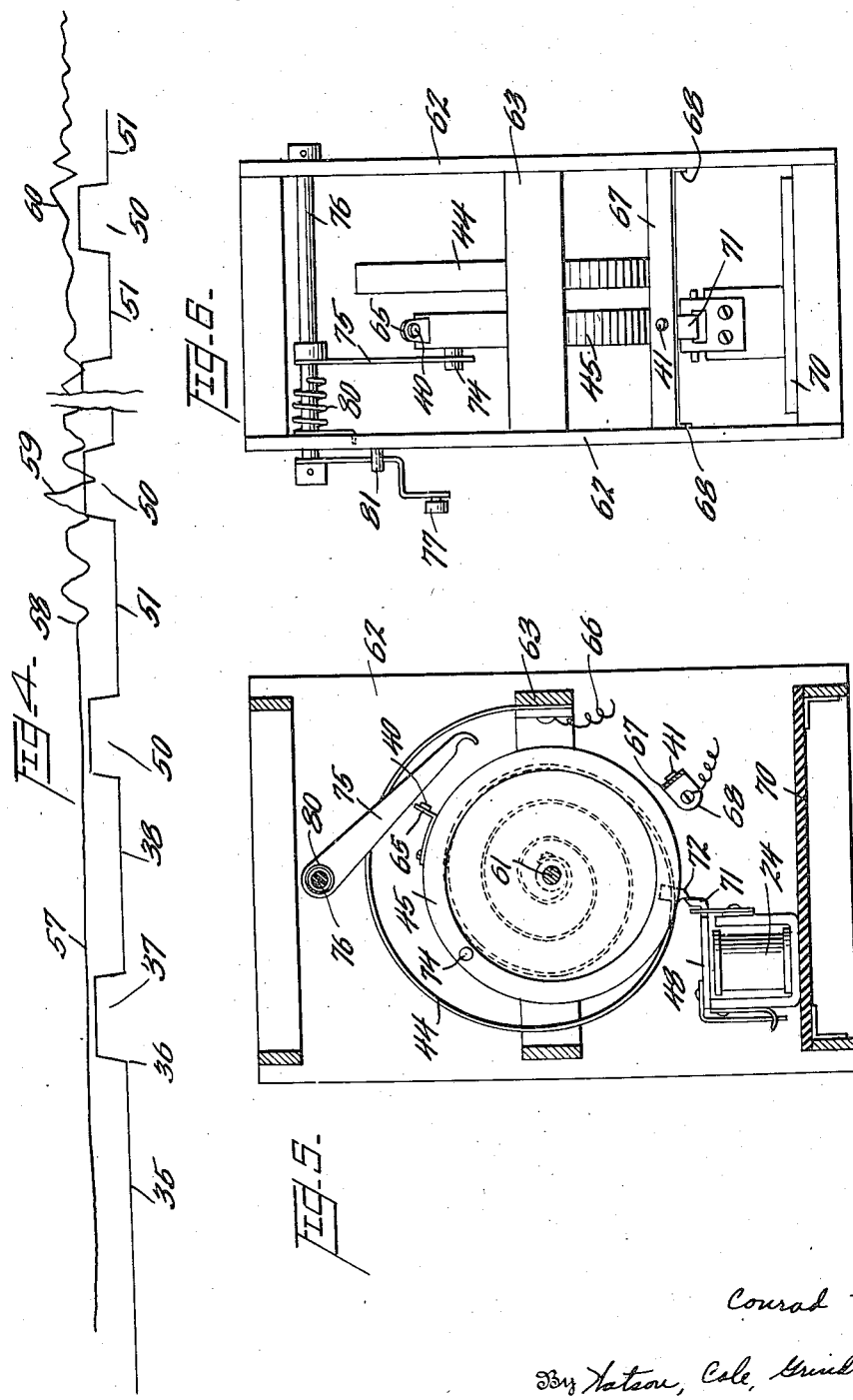

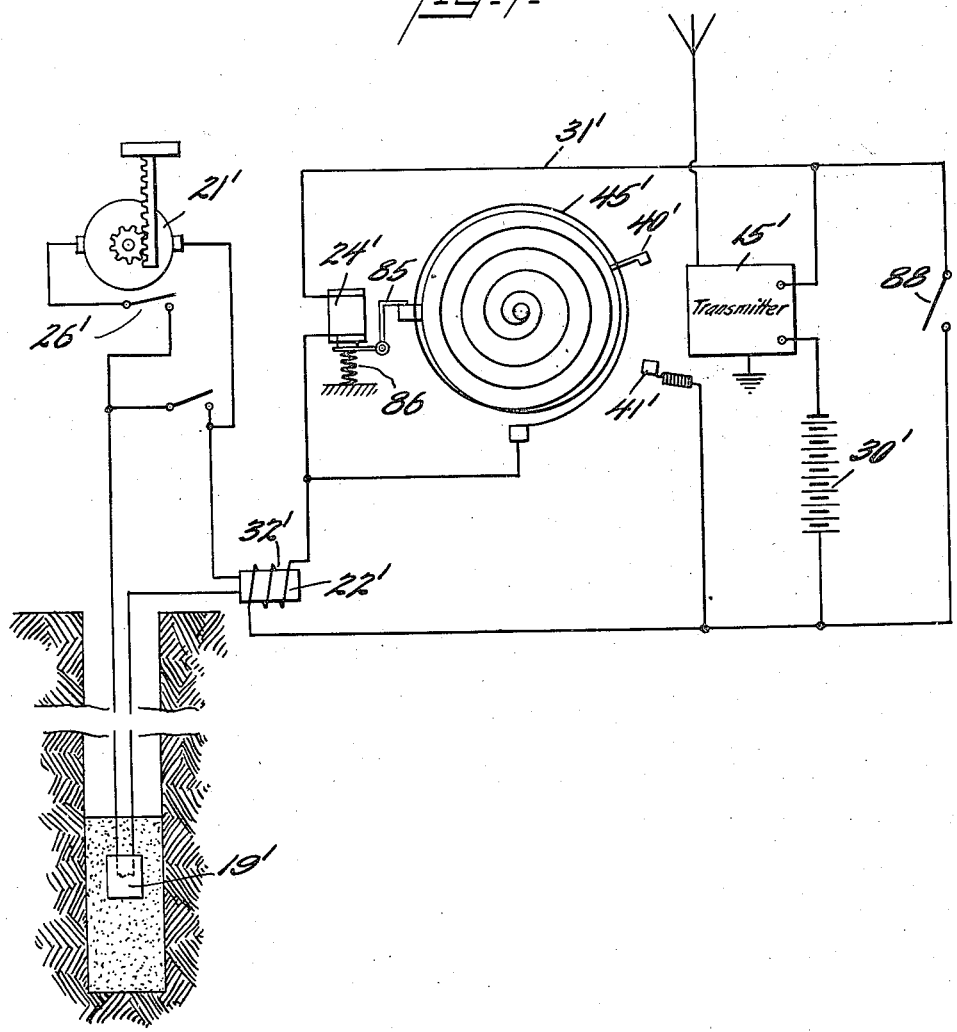

2,340,770

UNITED STATES PATENT OFFICE 2,340,770

SEISMIC RECORDING SYSTEM

Conrad Reichert, San Antonio, Tex., assignor to Olive S. Petty, San Antonio, Tex.

Application June 13, 1940, Serial No. 340,411

8 Claims. (Cl. 177—352)

This invention relates to methods of and apparatus for seismic surveying as practiced for geophysical prospecting, and deals particularly with methods of and apparatus for the transmission of time-break signals to a plurality of remotely situated seismometer-recorders in order to permit its use as a reference point in computations and among other things, the ascertaining of the distance from each of these to the shot-point by the measurement of the interval between the actual firing of the shot and the receipt at the particular station of the sound wave therefrom.

It is a general object of the present invention to provide novel and improved methods of and apparatus for seismic surveying.

More particularly it is an object of the invention to provide means for transmitting, by radio, the "time-break" or shot-instant, together with subsequent signals which permit a coordination of results at a number of receiving and seismometer stations.

An important feature of the invention resides in the system for transmitting "time-break" signals to a plurality of recorders of seismic waves, wherein the firing of the shot transmits a radio signal and wherein this firing places in operation means to successively and at odd intervals repeat this signal so as to permit records at several receiving stations to be coordinated and the time-break located in the event that static or other interference prevented the receipt of the first signal at one or more of the plurality of stations.

Another important feature of the invention resides in the provision and use of equipment whose operation is initiated by the firing of the shot to send out irregularly spaced signals to be recorded at each of the receiving stations, the odd spacing permitting a coordination of the records and the location of the time-break on any one where the radio signal was disturbed at that moment.

Still another important feature of the invention consists in the means for automatically interrupting the signal transmitted from a radio transmitter upon the occurrence of the explosion of the charge which creates the artificial seismic waves.

A further important feature consists in the arrangement of equipment, brought into operation simultaneously with the firing of the shot, which provides successive interruptions of the radio transmission after the shot instant to provide identifiable interval marks on the record.

Other and further features and objects of the invention will be more apparent to those skilled in the art upon a consideration of the accompanying drawings and following specification wherein is disclosed a single exemplary embodiment of the invention with the understanding that such changes may be made therein as fall within the scope of the appended claims without departing from the spirit of the invention.

In said drawings:

Figure 1 is a plan lay-out of seismometers and shot-point as used in refraction fan shooting where apparatus in accordance with the present invention is particularly desirable;

Figure 2 shows schematically and diagrammatically the lay-out and wiring of apparatus at the shot-point or transmitting end;

Figure 3 is a view similar to Figure 1 but showing the apparatus at any seismic, sound, and radio-receiving and recording station;

Figure 4 shows on a reduced scale a fragment of a record made by the use of apparatus according to Figures 1 and 2;

Figure 5 is a vertical section through the automatic odd-interval timer illustrating the principal parts thereof;

Figure 6 is a side elevation thereof; and

Figure 7 is a view similar to Figure 2 but showing a modified construction.

Seismic prospecting is a process for determining the depth, inclination and thickness of sub-surface strata and is usually carried out by firing a charge of dynamite and measuring the time required for the seismic waves, so generated, to reach one or more stations spaced at intervals from the charge. With a knowledge of the time and approximate velocities of travel of the waves, determinations can be made of the depth, slope and thickness of various strata. Two factors are of extreme importance in this work, the first being to record or make available for the record at each receiving station the exact instant of firing the charge and the second being to record the time of arrival of each reflected or refracted wave. The present invention deals particularly with the method for transmitting to each station means permitting an accurate determination of the instant of shot-firing and the time-interval elapsing between this firing and the arrival of each of the seismic waves.

In certain types of seismic surveying and in particular in so-called refraction shooting, the distances between the "shot-point," where the artificial seismic waves are created by the explosion of blasting material, and the various seismometer-recorder stations are very great. They may often vary from 5 to 15 miles and where refraction "fans" are shot, a great number of seismometer-recorders may be spaced at random from the shot-point. Because of the irregular terrain and various intervening obstructions, it is difficult if not impossible, with the means and time at the command of a party conducting this sort of work, to make actual measurements of the distances between each of the stations and the shot-point and yet these distances must be known with considerable accuracy in order that the velocities of the various seismic waves may be computed for determining the character of the subterranean formations. This has led to timing of the sound waves from the shot-point to the recorder to permit a reasonably accurate computation of the distance by known methods. The recording stations will not all be so located that the flash of the shot can be observed. Even if they could be, a manual method is not conducive to accuracy, so resort has been had to radio transmission for delivering from the shot-point to each of the recorder stations the so-called "time-break" or exact instant of firing of the charge, which is also used in computing seismic wave velocities.

It is obvious that with recording stations, each with a radio receiver, scattered so widely over the countryside, difficulties may be experienced at certain of these receiving stations in obtaining a signal at the exact instant of the shot discharge. It is apparent that the signal-noise ratio and field strengths of the shot transmitter may be widely different at the various receiving stations and that static may be present at some of them and not at others, particularly at the time of firing the shot. If, under the older systems, any station failed to receive the time-break signal by radio, its records were substantially useless since no starting point for velocity and other determinations would be available and further, since its distance could not be accurately computed from the shot-point without a considerable amount of additional work, carrying forward or backward the result from the other stations.

In accordance with the present invention, however, a means is provided which sends a plurality of signals subsequent to the time-break but within the duration of the seismic and sound waves and gives these signals different spacings or intervals. It is clear that each of the receiving stations, in spite of severe static will receive a number of these signals and, because of their irregular intervals, the records can be matched by comparison with those of other stations where the time-break signal was received. Thus there can be determined the actual time-signal position on these records and they can be saved for computation.

Figure 1 shows in plan a typical arrangement of shot-point and seismometers in so-called refraction fan shooting, in connection with which this invention will be described, although it is not limited to this particular type of seismic surveying, but may be used with reflection and other types of work. The shot-point is at 10 where the charge may vary from a few pounds to several tons of blasting material usually arranged at the bottom of a bore-hole from thirty to fifty feet or more in depth so that the charge is placed beneath the weathered layer of the earth and in material capable of effective delivery of the seismic energy. The hole is customarily filled with water, after the charge is placed, to provide tamping. At each of the stations 12 is arranged a seismometer-recorder capable of responding to the various seismic waves which travel through the several layers of the earth and also responsive to sound waves. The distance from each station to the shot-point must be accurately known in order that the velocities of these waves can be computed for ascertaining the character of the soil through which they have travelled. The distances are great and the difficulties of making actual surveys are such that they would be too costly and time-consuming. Furthermore, for the purpose of ascertaining the wave velocities and other information, the instant of shot-firing or so-called "time-break" must be recorded at each seismometer station in order that the time elapsing from the initiation of the seismic waves until their arrival at the various stations can be ascertained. The most satisfactory way of delivering a signal indicative of the instant of the shot firing is by radio since it is independent of terrain and other hindrances. Therefore, in accordance with the invention, apparatus such as shown in Figures 2 and 3 is provided, the equipment of Figure 2 being placed at the shot-point 10 and equipment such as shown in Figure 3 at each of the stations 12.

The transmitter 15 of Figure 2 is any conventional radio transmitter preferably equipped for continuous wave-transmission on a frequency within the band allotted for geophysical prospecting. The receiver 16 at each of the distant stations 12 is any conventional receiver for picking up the carrier wave from the transmitter 15 and demodulating the same if necessary. The time-interval necessary for the radio wave to travel is inconsequential at the distances used and in the computations effected.

The hole 17 for the shot is shown as loaded with an explosive 18 in which is embedded a detonator or cap 19 of the electrically ignited type. Conductors 20 from the bridge wire of cap 19 lead respectively to the blasting machine 21 and to the second detonator or cap 22 placed on the surface of the earth. A return conductor 23 from the second cap passes through the winding of the magnet 24 and back to the blaster. This puts the two caps 19 and 22 in series with the blasting machine which is of conventional construction delivering direct current when the plunger 25 is depressed. This brings the armature up to speed and when the plunger reaches the bottom of its movement, it engages and closes the switch 26, in the series circuit just described, and normally open to permit the blaster to be brought up to speed at no load. The closing of this switch applies current suddenly to the bridge wires of the caps which are heated to explode the detonating material therein.

The transmitter 15 has its oscillating tube excited by a suitable source of high potential 30, the circuit for which passes through conductors 31 leading to the wire 32 coiled about the surface cap 22. The transmitter is normally in operation prior to actuation of the blaster and preferably sends out an unmodulated continuous wave which is received by the radio receiver 16, but produces no record. The straight line illustrated at 35 on the sample record shown in Figure 4 is merely the shadow of the stationary galvanometer string or reflection from a suspended mirror. This string, being a portion of a conventional galvanometer-recorder, may be transformer-coupled to the output of the radio receiver and hence is not displaced as a result of the additional steady anode current flowing in the detector or amplifier tube circuit consequent to receiving the unmodulated carrier wave.

When the blaster is depressed to explode the charge, the surface cap is simultaneously exploded, breaks the wire 32 and stops the operation of the transmitter. The carrier wave is instantly stopped as indicated at 36 in Figure 4 and a hump 37 is formed in the record subsequent to this because the sudden cessation in signal effects a material and instantaneous change in the anode current in the receiver which gives the string of the galvanometer a violent deflection. When this current becomes steady the string quiets as shown at 38.

It will be obvious that instead of "keying" the radio transmitter by means of the break-wire 32, any of the conventional methods of modulating the carrier wave may be resorted to without the exercise of invention and the expression "modulating" will be used in the broad sense to cover any form of variation of the carrier which can be appreciated at the receiver.

As shown in Figure 2, a pair of contacts 40 and 41 are connected by conductors 42 and 43 in shunt to the break-wire 32 so that they may close the anode circuit of the transmitter to reestablish the carrier signal when brought together. The contact 41 is resiliently mounted as will be later described, while the contact 40 is carried by a balance wheel 45 biased to close the contacts by means of a balance spring 44. During the operation of exploding the charge, the balance wheel 45 is restrained in the contact separating position illustrated, by means of a latch 47. This latch is connected with the armature 48 of the electromagnet 24 so that the balance wheel is released when the magnet 24 is energized and the contacts 40 and 41 are brought together but are immediately separated by the bouncing action resulting from the resilient mounting of contact 41. Thereafter these contacts are brought together at intervals under the action of the spring 44 and again separated by the resilient contact.

Because of the resilient mounting of contact 41 and the long, rather floppy helical spring 44, the bouncing does not take place at uniform intervals and the first few bounces are quite irregular, thereafter becoming more regular but gradually decreasing in size as the amplitude of the bouncing decreases. These contacts 40 and 41 engage and key the transmitter to re-establish the carrier frequency each time they are closed and to stop it as soon as they are opened. Each time they close, a break such as 50 appears on the chart illustrated in Figure 4 and the lines 51 of unequal length occurring between these breaks may be used for matching tapes from various receivers in order to establish the time-break 36 on any which may have not properly recorded this time-break due to static or man-made interference.

The second trace on Figure 4 is that made by the arrival of seismic and sound waves at the seismometer 55 shown in Figure 3 which is jointly connected, with the receiver 16, to the recorder 56 which is a conventional apparatus containing two or more galvanometer elements whose shadows or reflections are recorded on moving photographic tape. The trace 57 of the seismometer is quiet for a considerable interval after the time-break arrival and the first indication 58 of a change from this condition discloses the arrival of the first seismic wave. Various deflections such as 59 indicate the arrival of other types of seismic waves and finally at 60 is seen the multiple deflection which indicates the arrival of sound waves through the air, which will sufficiently agitate the earth to actuate the seismometer if it is not equipped to be directly sonic-responsive.

The odd interval timer is shown in greater detail in Figures 5 and 6 and comprises the balance wheel 45 of suitable size and construction mounted on pivots or shafts 61 supported in bearings (not shown) between the side plates 62 of a framework which may be encased in a suitable housing if desired. The balance spring 44, which corresponds to the hair spring of a watch, has one end attached to the spindle 61 and the other end to a spacer strip 63 maintaining the side plates 62 in position. This spring also forms the conductor for current to the contact 40 mounted on the bracket 65 on the periphery of the balance wheel and the conductor 66 permits it to be connected into the circuit for keying or modulating a transmitter.

The resiliently mounted contact 41 is carried on a narrow spring strip 67 which spans the side plate 62 and has its down-turned ends 68 secured thereto.

The electromagnet 24 is shown mounted on the base plate 70 of the frame and the armature 48 thereof is shown provided with a lug 71 cooperating with the dog 72 projecting from the periphery of the balance wheel.

A laterally projecting pin 74 on the rim of the balance wheel is in the path of a lever 75 carried on an insulating cross-shaft 76 pivoted in the side plates 62 and provided on the front of one of them with an operating handle 77. When the handle is moved so as to throw the lever clockwise as viewed in Figure 5, the balance wheel is rotated counter-clockwise to separate the contacts 40 and 41, which may be normally held in engagement by the spring 44, and the dog 72 engages the latch 71, depresses it, drops behind it, and holds the balance wheel and spring in cocked position. The cocking arm 75 is returned to the position illustrated in Figure 5 and held there by a helical spring 80 surrounding its shaft and urging the outer cocking handle 77 against a stop pin 81. A switch 83 may be provided to permit optional operation of the transmitter before and after the "shot."

A second form of the invention modified somewhat from that disclosed in Figure 2 is shown in Figure 7. Here all of the major elements of the system are identical with those disclosed in Figure 2 and need no particular comment here. The circuits, however, are somewhat different. For instance, the blasting circuit comprises only the blaster 21', its switch 26', the cap 19', in the charge and the surface cap 22'. The magnet 24' is not arranged in this circuit but is introduced in the circuit 31' placing in series the high voltage battery 30', the anode circuit of the transmitter 15' and the wire 32' about the surface cap. The contacts 40' and 41' of the balance wheel 45' are arranged in shunt to wire 32'.

The latch for the balance wheel is now numbered 85 and is biased by means of a spring 86 to unlatching position. It is held in latching position against the power of the spring by means of the magnet 24' through which flows current from the battery 30'.

To place the device in operation the transmitter is turned on, which energizes the magnet 24' so that the latch is in condition to hold the balance wheel in cocked position when it is manually so set. Operation of the blaster causes the surface cap 22' to break the conductor 32' which opens the circuit 31' and permits the spring 86 to release the latch 85 putting odd-interval contactor into operation as previously described. A switch 88 permits operation of the radio transmitter at any time desired irrespective of the condition of the contacts 40' and 41' or the wire 32'.

It is obvious that the timing mechanism may take numerous forms and that illustrated is merely representative of one proven satisfactory in field operations to provide the necessary irregularly-spaced circuit-closing operations extending over a considerable period of time to provide an adequate number of markers on the traces or records to permit comparing different records, some of which may be badly marred by the presence of static or other noise indications thereon.

Having thus described the invention, what is claimed as new and desired to be secured by Letters Patent is:

1. Apparatus for the transmission by radio of a signal indicative of the instant of detonation of an explosive charge, to a plurality of remote receivers and recorders of radio, sound and seismic waves, comprising, in combination, a generator and transmitter of a radio wave of normally fixed frequency, means actuated with the detonation of the explosive to modulate said wave, aperiodic bouncing mechanism normally restrained, means actuated by the firing of the explosive to release said mechanism, and means modulating said wave at each bounce.

2. Apparatus for the transmission by radio of a signal indicative of the instant of detonation of an explosive charge, to a plurality of remote receivers and recorders of radio, sound and seismic waves, comprising, in combination, a generator and transmitter of a radio wave of normally fixed frequency, means actuated with the detonation of the explosive to modulate said wave, bouncing mechanism including means to modulate said wave at least once per bounce, means to place said mechanism in operation, and means to vary the bounce intervals whereby records from different recorders may be subsequently matched in time for the location of the first modulation on any record failing to contain a clear indication thereof.

3. Apparatus for the radio transmission of a time-break signal resulting from the firing of a shot, to a plurality of remote recorders of seismic waves comprising, in combination, a generator and transmitter of a continuous radio wave, a keying circuit for said transmitter, a conductor closing said circuit and positioned to be disrupted by the firing of said shot, a normally open set of contacts adapted for closing said circuit after said disruption, a balance wheel carrying one of said contacts, means mounting said wheel for oscillation, a spiral spring connected to said wheel, means for rotating said wheel manually to cock said spring, latch mechanism to hold the wheel in cocked position, means actuated by the disruption of said conductor to release said latch, stop means for said wheel to arrest its motion after less than one rotation upon release by said latch, and being constructed to bounce the wheel in a reverse direction, said other contact being mounted on said stop means.

4. Apparatus for the radio transmission of a time-break signal resulting from the firing of a shot, to a plurality of remote recorders of seismic waves comprising, in combination, a generator and transmitter of a continuous radio wave a keying circuit for said transmitter, a conductor closing said circuit and positioned to be disrupted by the firing of said shot, a balance wheel, means mounting said wheel for oscillation, spring means associated with said wheel, manual means for rotating said wheel to cock the spring, latch mechanism to hold the wheel in cocked position, electromagnetic means to release said latch when the shot is fired, a projection on said wheel, a resilient stop engageable by said projection to bounce the wheel in reverse direction when engaged, and keying circuit controlling means brought into play by said engagement.

5. Apparatus for the radio transmission of a time-break signal resulting from the firing of a shot, to a plurality of remote recorders of seismic waves comprising, in combination, a generator and transmitter of a continuous radio wave, a keying circuit for said transmitter, a conductor closing said circuit and positioned to be disrupted by the firing of said shot, a balance wheel mounted for oscillation, a balance spring, manual means for rotating said wheel to cock said spring, a latch to retain the wheel in cocked position, a contact rotatable with said wheel, a spring-mounted contact positioned to be engaged by the first contact when the wheel is released by said latch, means responsive to the firing of the shot to release said latch, and connections from said contacts to said keying circuit.

6. Apparatus for the radio transmission of a time-break signal resulting from the firing of a shot, to a plurality of remote recorders of seismic waves comprising, in combination, a generator and transmitter of a continuous radio wave, a keying circuit for said transmitter, a conductor closing said circuit and positioned to be disrupted by the firing of said shot, a normally open set of contacts adapted for closing said circuit after said disruption, a spring mounting one of said contacts, a balance wheel mounting said other contact, a balance spring for said wheel, a cocking means to manually separate said contacts and tension said spring, a latch to hold said wheel in cocked position, and means actuated by the firing of said shot to release said latch.

7. Apparatus for the radio transmission of a time-break signal resulting from the firing of a shot, to a plurality of remote recorders of seismic waves, comprising, in combination, a blaster, a cap, a circuit connecting the same, a charge adapted to be fired by said cap, a generator and transmitter of a continuous radio wave, a keying circuit for said transmitter, a conductor closing said keying circuit and positioned to be disrupted by the firing of said charge, a normally open set of contacts adapted for momentarily closing said keying circuit at odd intervals subsequent to said disruption, one of said contacts being resiliently mounted, a balance wheel mounting the other contact, a balance spring for said wheel, means to rotate said wheel to separate said contacts and to cock said spring, a latch to hold said wheel in cocked position, an electromagnet positioned to release said latch, said magnet being connected in the blaster-cap circuit for the purpose described.

8. Apparatus for the radio transmission of a time-break signal resulting from the firing of a shot, to a plurality of recorders of seimic waves, comprising, in combination, a blaster, a cap, a circuit connecting the same, a charge adapted to be fired by said cap, a generator and transmitter of a continuous radio wave, a keying circuit for said transmitter, a conductor closing said keying circuit and positioned to be disrupted by the firing of said charge, a normally open set of contacts adapted for momentarily closing said keying circuit at odd intervals subsequent to said disruption, one of said contacts being resiliently mounted, a balance wheel mounting the other contact, a balance spring for said wheel, mean to rotate said wheel to separate said contacts and to cock said spring, a latch to hold said wheel in cocked position, an electro-magnet to bias the latch to holding position, and releasing means for the latch normally overcome by said magnet, said magnet being connected in the said keying circuit so as to be de-energized by the firing of the charge.

CONRAD REICHERT.